(12) United States Patent
Seima et al.

(10) Patent No.: US 6,528,968 B2
(45) Date of Patent: Mar. 4, 2003

(54) BRUSHLESS-MOTOR DRIVER IN PWM MODE

(75) Inventors: Toshiaki Seima, Tottori-ken (JP); Yoshiaki Iwayama, Osaka-fu (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/094,250

(22) Filed: Mar. 8, 2002

(65) Prior Publication Data

US 2002/0158600 A1 Oct. 31, 2002

(30) Foreign Application Priority Data

Mar. 9, 2001 (JP) ........................................ 2001-066354

(51) Int. Cl.[7] .................................................. H02P 5/40
(52) U.S. Cl. ........................ 318/811; 318/727; 318/254; 318/138; 318/439
(58) Field of Search ................................ 318/254, 138, 318/439, 727, 811

(56) References Cited

U.S. PATENT DOCUMENTS

| | | | | |
|---|---|---|---|---|
| 4,472,666 A | * | 9/1984 | Akeda et al. ................ | 318/254 |
| 5,081,409 A | * | 1/1992 | Goff ........................... | 318/811 |
| 5,309,078 A | * | 5/1994 | Cameron ..................... | 318/811 |
| 5,517,095 A | * | 5/1996 | Carobolante et al. ........ | 318/254 |
| 6,153,989 A | * | 11/2000 | Kardash et al. .............. | 318/254 |

FOREIGN PATENT DOCUMENTS

| | | |
|---|---|---|
| JP | 5-211780 | 8/1993 |
| JP | 2000-125590 | 4/2000 |

\* cited by examiner

*Primary Examiner*—Rita Leykin
(74) *Attorney, Agent, or Firm*—RatnerPrestia (57) ABSTRACT

In a driver of a brushless motor performing synchronous rectification PWM operation, switching is performed at an arbitrary timing between a synchronous rectification PWM operation and one-way PWM operation to prevent a negative current for the power supply, and thus preventing increase of a power supply voltage due to the negative current, thereby implementing high performance and high reliability.

8 Claims, 7 Drawing Sheets

BRUSHLESS-MOTOR DRIVER IN PWM MODE

BACKGROUND OF THE INVENTION

1. Field of the Invention

The present invention relates to a brushless-motor driver for driving a brushless-motor employing a pulse-width-modulation (hereinbelow called "PWM") driving technique, for use in various fields of, for example, information equipment such as information-processing devices.

2. Description of the Prior Art

Conventionally, there has been used a brushless-motor driver (or motor driving apparatus) of a synchronous rectification type employing a PWM driving method, as disclosed in the Japanese Patent Unexamined Laid-open Publication No. 5-211780. In this conventional driving apparatus which includes drive transistors and paired drive transistors for switchably providing driving current to motor-driving coils, when the drive transistors are in a PWM switching-off state, the paired drive transistors are turned on to flow current therethrough instead of providing a regeneration current to flow through diodes connected in parallel to the respective paired drive transistors when PWM switching is OFF, thereby reducing power dissipation.

Figure 5:
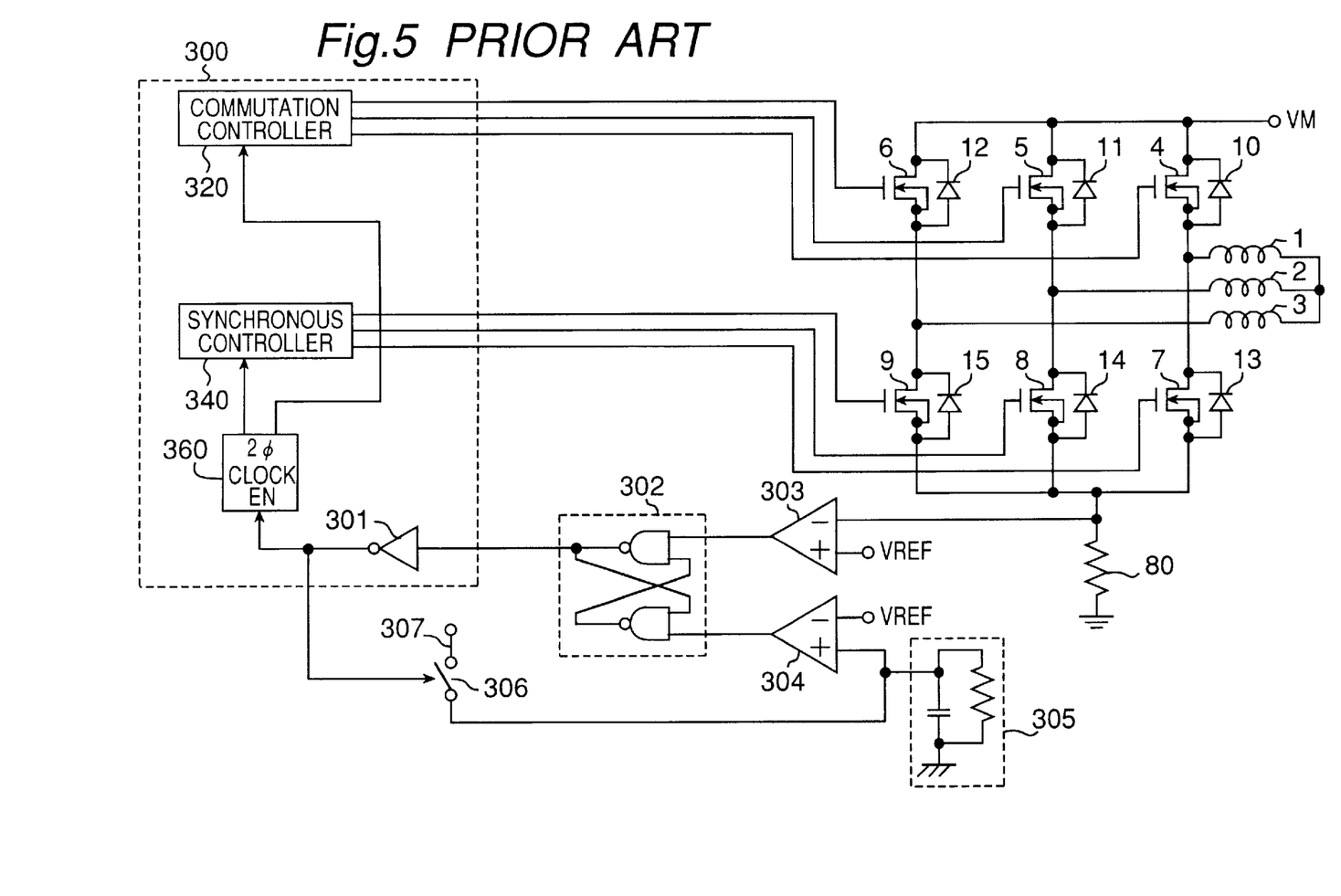
FIG. 5 is a circuit configuration view of a conventional brushless-motor driver.

FIG. 5 shows a configuration of the conventional brushless-motor driver employing the synchronous rectification PWM driving method. Referring to FIG. 5, reference numeral 320 denotes a commutation controller circuit; 340 denotes a synchronous rectification controller circuit; 360 denotes a 2-phase non-overlapping clock circuit; and numerals 4 to 6 and 7 to 9 respectively denote upper drive transistors and lower drive transistors. In addition, numerals 10 to 12 and 13 to 15 respectively denote flywheel diodes; 303 to 304 individually denote comparators; VM denotes a power supply terminal; 305 denotes an RC discharge circuit; 302 denotes a flip-flop; 301 denotes an inverter; 1 to 3 individually denote motor-driving coils; and 80 denotes a current-sensing resistor.

Hereinbelow, a description will be made regarding a PWM driving operation of the conventional brushless-motor driver shown in FIG. 5.

During an energized phase, one node (for example, node A) is driven high by one of the upper drive transistors 4 to 6 (for example, by the drive transistor 6). One node (for example, node B) is driven low by one of the lower drive transistors 7 to 9 (for example, by the drive transistor 8), and the other node (for example, node C) is left floating with both the upper drive transistor 4 and lower drive transistor 7 being OFF. Driving coils are then switched in a commutation sequence that maintains the current in one driving coil during switching.

During a PWM mode, the current is sensed across the current-sensing resistor 80, and is compared to a reference voltage VREF by the comparator 303, which determines the maximum current that can be developed in the driving coils 1, 2, and 3. As the current reaches the reference voltage VREF, the comparator 303 flips its output to reset the flip-flop 302. Thereby, the upper transistors 4 to 6 are switchably controlled through the inverter 301, the 2-phase non-overlapping clock 360, and the commutation control circuit 320 to shut off the upper transistors 4 to 6 across all the output nodes A, B, and C.

Simultaneously, the RC discharge circuit 305 is enabled, i.e., is driven to be operable by opening a switch 306, and the RC discharge circuit 305 creates a time delay during which the upper transistors 4 to 6 are maintained OFF. When the voltage on a capacitor of the RC discharge circuit 305 falls below the reference voltage, the output of the comparator 304 reverses and toggles the flip-flop 302, thereby turning the upper transistor which corresponds to the phase being driven, back on again. As a result, the current ramps up, that is, the current diagonally rises. Then, a series of this operation cycle is repeated.

Description is continued using an AB phase by way of an example. First, during the ON time, the current ramps up via the driving coils 2 and 3 between the nodes A and B, and flows through the ON-selected upper transistor 6.

Subsequently, when the upper transistor 6 is shut off in a PWM chop cycle operation, the flywheel diode 15 in parallel with the lower transistor 9 must forward bias to maintain the current in the driving coils 2 and 3, maintaining the electric potential of the node A high. The lower transistor 8 must remain ON to maintain the node B low.

In addition, when the PWM chop cycle shuts off the upper transistor 6, the driving coils 2 and 3 turn into a decaying current source, and the energy stored therein must be dissipated. It is provided through a driving current being applied to the lower transistor 9 from a non-rectifying ground return path for the flyback energy in the active driving coil when a drive voltage to the active driving coil is turned off in the PWM mode. Thus, when the upper transistor 6 is shut off, the lower transistor 9 is turned on, and thus the circuit would appear as if the driving coils 2 and 3 were shorted through two resistors, and no diode were provided. The switching operation of the lower transistors 7 to 9 is accomplished with the synchronous-rectification controller circuit 340 in synchronism with signals developed by the commutation control circuit 320, as below described in detail.

Figure 6:
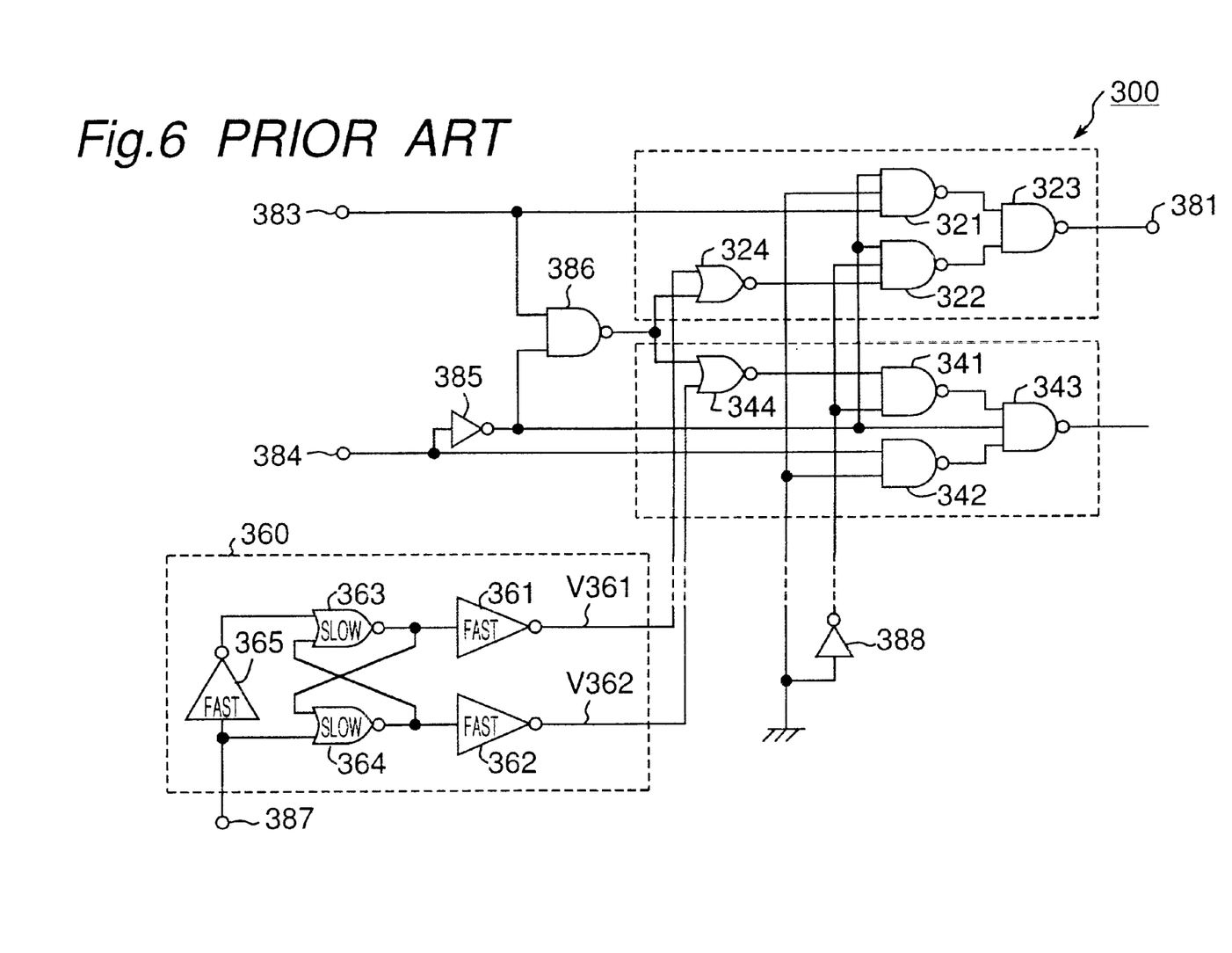
FIG. 6 is a circuit configuration view of a control circuit in the conventional brushless-motor driver.

FIG. 6 shows only a portion for one phase of the motor driver circuit as a portion of a control circuitry 300 that is to be provided in the control circuitry 300 shown in FIG. 5. However, it should be understood that similar circuitry is provided for the remaining phases. The control circuitry 300 is a logic circuit configured such that an upper-driving-transistor driving circuitry and a lower-driving-transistor driving circuitry are driven according to commutation signals on lines 384 and 383. Other signals to be input to the control circuitry 300 are sent from the flip-flop 302, as shown in FIG. 5.

To assure that both the upper and lower driving transistors are not simultaneously active, the 2-phase clock 360 is provided having two output signals V361 and V362 which carry exclusively out-of-phase clock signals. The 2-phase clock 360 operates to turn on the upper transistor when the paired lower transistor is turned off, and it operates to turn on the lower transistor when the paired upper transistor is turned off. Hereinbelow, the terminology "synchronous rectification PWM" refers to performance of the above PWM operation of both the paired upper and lower transistors.

Thus, in the above-described conventional example, the control circuitry 300 enables the switching between synchronous-rectification PWM operation and normal linear operation.

However, in the above-described conventional configuration, the PWM-operation pulse-width (duty), which is proportional to a torque command, decreases in the synchronous rectification PWM operation according to variations in the motor revolution, variations in load, or a deceleration command as a torque command. This creates a problem in that the regeneration current flowing across the driving coils reversely flows to a power supply. The reverse current hereinbelow will be referred to as a negative current.

In addition, problems arise in that with the aforementioned negative current flowing, the power supply voltage is increased according to an impedance on the power supply side, thereby causing breakdown in the motor and the motor driver, or a device set including the motor.

Moreover, in order to control the motor at an arbitrary revolution number, the PWM duty proportional to the torque command needs to be varied in the PWM drive mode, and the motor application voltage needs to be varied proportional to the torque command in the linear drive mode. This arises problems in that the circuitry configuration is complicated, causing an increase in cost and other various adverse effects are caused. Furthermore, a problem arises in that the linear operation requires increased power consumption.

SUMMARY OF THE INVENTION

The present invention has been developed to solve these problems inherent to the conventional motor driver. Accordingly, an object of the present invention is to provide a brushless-motor driver that enables implementation of reduction in power consumption, preventing negative current from occurring due to variations in revolution and load of the brushless motor, and enables the implementation of high performance as well as high reliability.

In order to achieve the aforementioned object, a first aspect of the present invention provides a motor driver for driving a brushless motor having a plurality of driving coils, which includes: a pair of an upper drive section and a lower drive section operatively connected to the driving coils for operating the brushless motor in a plurality of operation modes including a synchronous rectification PWM mode and a one-way PWM mode; and a switching controller for controllably switching the PWM modes between the synchronous rectification PWM mode and the one-way PWM mode in a phase-switching timing period.

In this arrangement, the PWM operation mode is switched to perform the one-way PWM operation mode during a deceleration period in operating the brushless motor, and the synchronous rectification PWM mode is performed in a non-deceleration period thereof, to thereby switch a regeneration current flowing path.

Thus, the present invention solves the problem of causing breakdown in a motor, a motor driver, or a device set including the motor caused by increase in power supply voltage according to the power supply impedance increased by the flow of the negative current.

In this first aspect, the upper and lower drive section pair may include paired drive switching units for switchably providing driving current to the driving coils, and when one of the paired drive switching units is in a PWM switching-off state in the non-deceleration period of the motor drive, the other of the paired drive switching units is turned on to flow a regeneration current through said the other drive switching unit via the driving coils, whereas, when one of the paired drive switching units is in a PWM switching-off state in the deceleration period of the motor drive, the other of the paired drive switching units is also turned off to flow the regeneration current through a diode connected in parallel to the other drive switching unit.

Thus, a low-loss operation can be implemented in comparison to the case of a linear operation. Concurrently, the flow of negative current to the power supply can be prevented.

A second aspect of the present invention provides a motor driver for driving a brushless motor which includes a rotor magnet and driving coils disposed to oppose the rotor magnet, where the motor driver includes: upper drive means constituted of a plurality of drive elements which are connected to the driving coils and are provided on one power supply line; and lower drive means constituted of a plurality of drive elements which are connected to the driving coils and are provided on another power supply line.

The motor driver further includes: position detector means for detecting a positional relationship between said rotor magnet and said driving coils; commutation switching means for generating a commutation switching signal to be supplied to the driving coils based on output signals of the position detector means; pulse-width modulator means which receives a torque command signal for controlling a generated torque of the brushless motor and generating an arbitrary frequency signal having a pulse width corresponding to the torque command signal; and PWM control means for controlling on/off operation of the upper drive means and lower drive means based on output signals of said commutation switching means and an output signal of the pulse-width modulator means.

In this arrangement, the PWM control means enables a synchronous rectification PWM operation to drive both the upper drive means and the lower drive means to perform a PWM operation, and said PWM control means does not perform the synchronous rectification PWM operation in a deceleration period in which a brake-wise current flows through said driving coils.

According to the above second aspect, the motor-revolution control can be implemented with low power consumption, and can be easily implemented by using a PWM signal proportional to the torque command signal. In addition, the synchronous rectification PWM operation is not performed in the timing, allowing a brake current to flow to the driving coils because of variations in the motor revolution, load, and the like. Accordingly, occurrence of negative current can be prevented; and various problems occurring due to the flow of negative current can be prevented.

Conceivable driving methods to be implemented with timing allowing brake-wise current to flow to driving coils include, for example, a method for causing only one of the upper and lower drive means; a method in which neither the upper drive means nor lower drive means is driven to perform PWM switching, but regeneration current is used to implement a short brake mode; and a method of turning the upper and lower drive means off (state where the motor output is of high impedance). Employing one of these methods enables low power consumption, low costs, high performance, and other advantages to be obtained.

In this second aspect, the motor driver may further include deceleration detector means for detecting a deceleration period in the torque command signal and supplying a detection result to the PWM control means.

In addition, the PWM control means may include a regeneration current control means for switching between on/off operations of the upper drive means and the lower drive means so that regeneration current in the driving coils which occurs during motor rotation due to the on/off operation of one of the upper drive means and said lower drive means does not reversely flow back to the power supply line.

This is effective in that the motor is controlled according to a PWM signal proportional to the torque command signal, and switching is performed for current paths through which regenerated current occurring due to the PWM operation flows, thereby preventing occurrence of negative current.

Conceivable timings for performing switching of the regenerated-current paths include, for example, a timing with which deceleration in a torque command is detected; a timing corresponding to a torque command signal, such as a torque command or the result of a comparison with a signal level proportional to the torque command and deceleration in the torque command; a timing corresponding to a signal proportional to a variation in the motor speed or the motor speed; a timing corresponding to a delayed time with respect to the start/stop of the motor; a timing corresponding to a variation in the powersupply voltage or a signal proportional to a variation in the powersupply voltage; and a timing corresponding to the negative current or a signal proportional to the negative current.

Employing one of these timings enables low power consumption, low costs, high performance, and other advantages to be obtained.

In this second aspect, the regeneration current control means may be operable to switch between a synchronous rectification PWM mode and a one-way PWM mode, the synchronous rectification PWM mode being for driving both of the upper drive means and the lower drive means to perform the PWM operation and the one-way PWM mode being for driving only one of the upper drive means and the lower drive means to perform the PWM operation.

In this case, the motor is controlled using a PWM signal proportional to the torque command signal, and the switching is performed between the synchronous rectification PWM mode and the one-way PWM mode. As such, the above arrangement has an advantage in that the switching is performed for the path through which a regeneration current flows because of the PWM operation, thereby preventing occurrence of negative current.

The third aspect of the present invention provides a motor and an information equipment such as a processing device each using the driver of the first and second aspect of the present invention, thereby implementing low power consumption and solving various problems occurring because of negative current.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which.

DESCRIPTION OF THE PREFERRED EMBODIMENT

Before the detailed description proceeds, it is noted that like parts are designated by like reference numerals throughout the accompanying drawings.

A preferred embodiment of the present invention will be described hereinbelow with reference to FIGS. 1 to 4.

Figure 1:
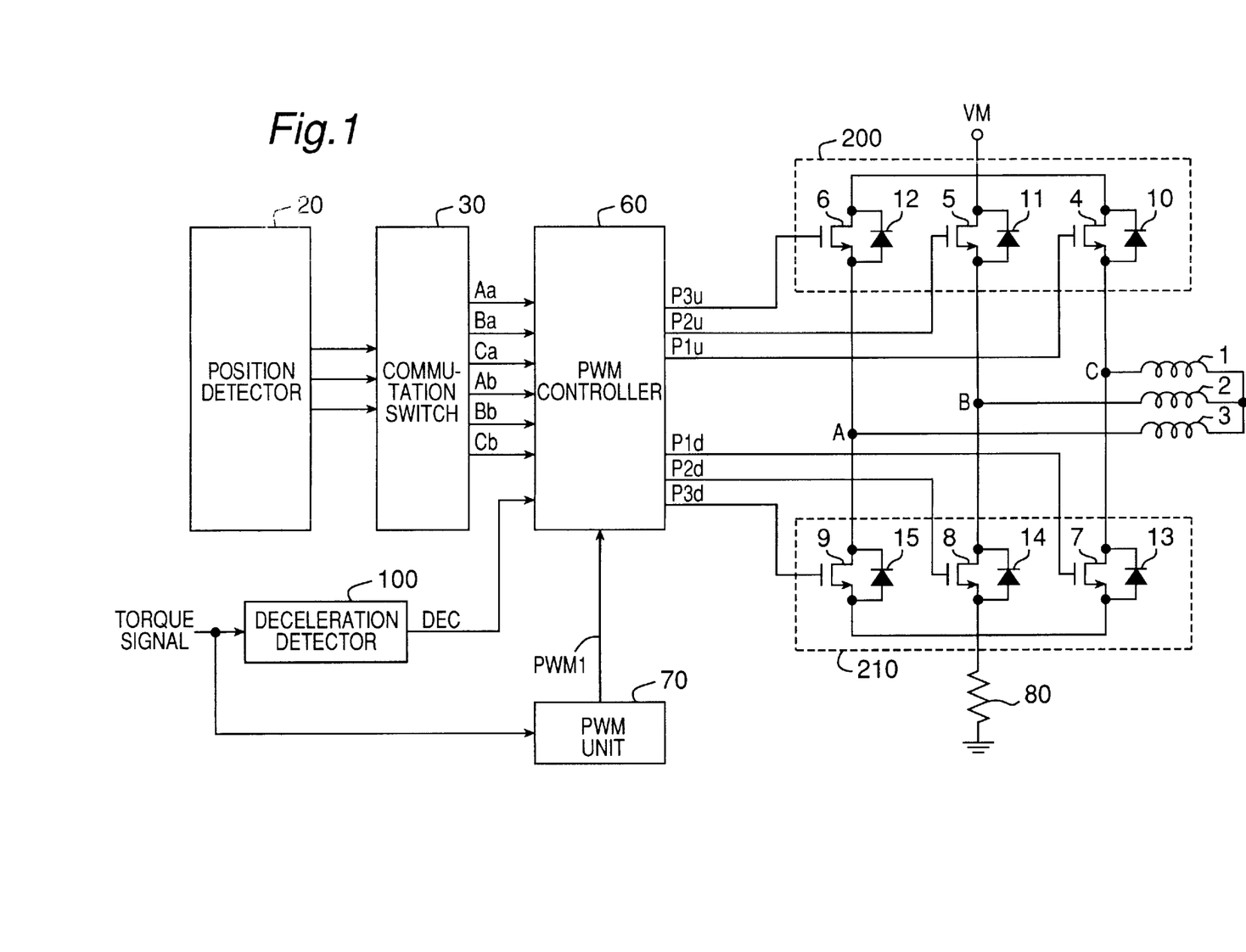
FIG. 1 is a circuit configuration view of a brushless-motor driver according to a first embodiment of the present invention.

Referring to FIG. 1, reference numerals 1 to 3 denote driving coils each of which is provided to oppose a rotor magnet of a blushless-motor (not shown), having terminals on one side of the driving coils commonly connected. Reference numerals 4 to 6 denote drive transistors of an upper side, and reference numerals 7 to 9 are drive transistors of a lower side. Reference numerals 10 to 12 denote flywheel diodes connected in parallel to the drive transistors 4 to 6, respectively. Similarly, flywheel diodes 13 to 15 are connected in parallel to the drive transistors 7 to 9, respectively. The drains of the drive transistors 4 to 6 are commonly connected and are connected to a power supply terminal VM. The sources of the drive transistors 7 to 9 are commonly connected and are grounded via a resistor 80.

A terminal (node C) of the driving coil 1, the source of the drive transistor 4, and the drain of the drive transistor 7 are commonly connected. A terminal (node B) of the driving coil 2, the source of the drive transistor 5, and the drain of the drive transistor 8 are commonly connected. A terminal (node A) of the driving coil 3, the source of the drive transistor 6, and the drain of the drive transistor 9 are commonly connected. The drive transistors 4 to 6 and the flywheel diodes 10 to 12 constitute an upper drive section 200. The drive transistors 7 to 9 and the flywheel diodes 13 to 15 constitute a lower drive section 210.

Reference numeral 20 denotes a position detecting section for detecting positions of a rotor and a stator by using, for example, a position detecting device (not shown) such as a Hall device, or by a counter-electromotive voltage induced by a motor driving coil. Outputs of the position detecting section 20 are supplied to a commutation switching section 30, and the commutation switching section 30 generates 3-phase fullwave-drive phase-switching signals (Aa, Ba, Ca; Ab, Bb, Cb) which are supplied to a PWM controller 60.

A torque command signal is inputted to both a pulse-width modulator section 70 and a deceleration detector section 100. Upon receipt of the torque command signal, the pulse-width modulator section 70 generates a signal PWM1 which is supplied to the PWM controller 60, where the signal PWM1 has a pulse width corresponding to the torque command signal in an arbitrary PWM frequency.

The deceleration detector section 100 detects a deceleration period of the torque command signal, and generates a detection signal DEC to the PWM controller 60. Outputs P1$u$ to P3$u$ and outputs P1$d$ to P3$d$ of the PWM controller 60 are supplied to the individual gates of the drive transistors 4 to 6 included in the upper drive section 200 and drive transistors 7 to 9 included in the lower drive section 210, respectively.

Figure 2:
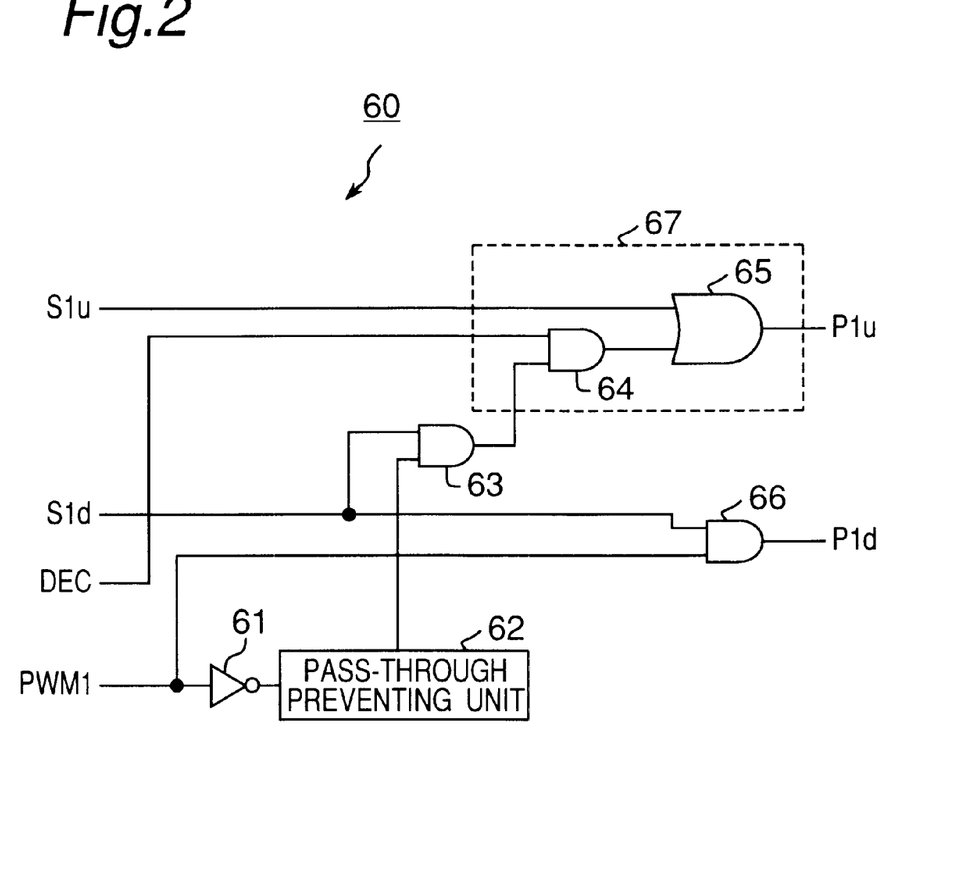
FIG. 2 is a circuit configuration view of a PWM control means according to the first embodiment of the present invention.

For example, a circuitry as shown in FIG. 2 can be considered as a circuit arrangement having a practical configuration of the PWM controller 60. It is noted here that FIG. 2 shows only the gate signals P1$u$ and P1$d$ supplied to the respective gates of the drive transistors 4 and 7 connected to the driving coil 1. However, also gate signals of the drive transistors connected to other driving coils 2 and 3 can be created similar to the above as such, and they are not shown in the figure for brevity.

Referring to FIG. 2, phase-switching signals S1$u$ and S1$d$ are output signals of the commutation switch section 30. The signal S1$u$ is inputted to an OR gate 65, and the signal S1$d$ is inputted to an AND gates 63 and 66. The signal DEC outputted from the deceleration detector section 100 is inputted to an AND gate 64. The signal PWM1 outputted from the pulse-width modulator section 70 is inputted to the AND gate 66 and is also inputted to a pass-through preventing circuit 62 via an inverter 61. An output of the pass-through preventing circuit 62 is inputted to the AND gate 63. An output of the AND gate 63 is inputted to the OR gate 65 through the AND gate 64, and outputs of the OR gate 65 and the AND gate 66 constitute an output of the PWM controller 60. The AND gate 64 and the OR gate 65 constitute a regeneration current control circuit 67.

Hereinbelow, an operation of the brushless-motor driver configured as described above will be described with reference to FIGS. 3A and 3B and FIGS. 4A and 4B.

Figure 3A:
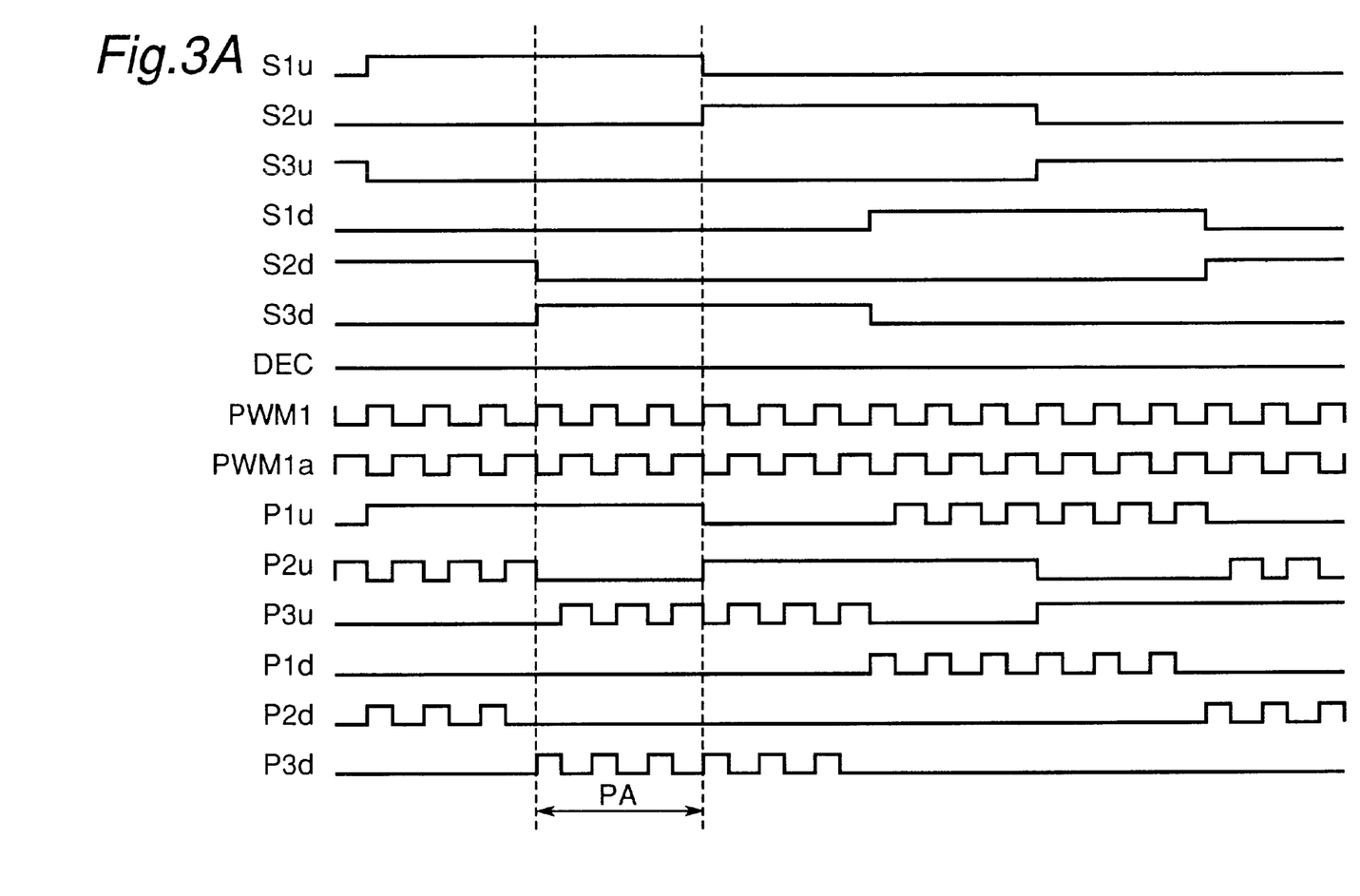
FIGS. 3A and 3B are charts each for explaining operation of the brushless-motor driver according to the first embodiment of the present invention.
Figure 3B:
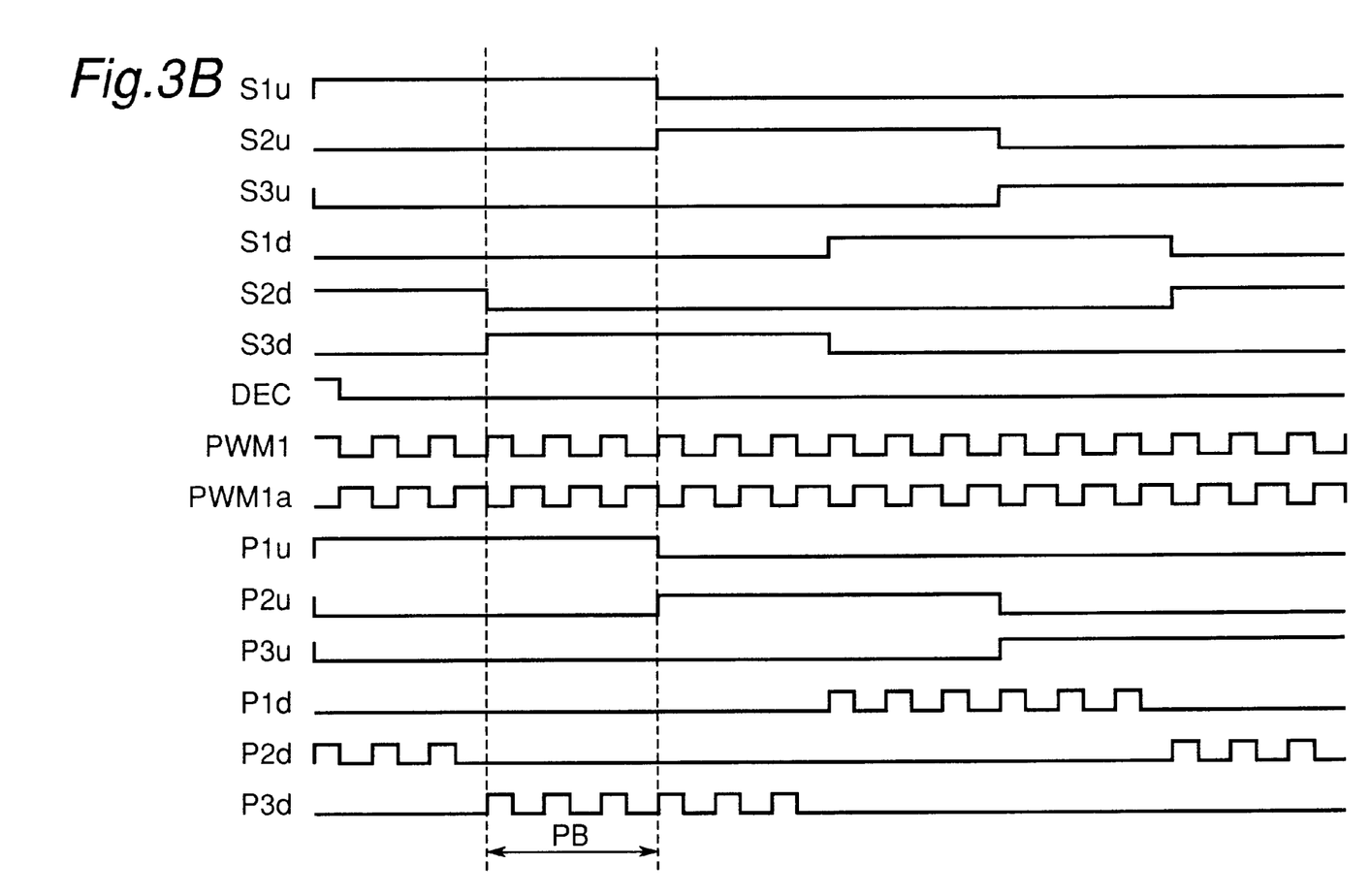

FIGS. 3A and 3B are timing charts for explaining operation according to the preferred embodiment of the present invention.

It is assumed that the level of the signal DEC output of the deceleration detector section 100 is low in the deceleration period of the torque command signal, and is high in the other (i.e., non-deceleration) periods.

First, a description will be made regarding an operation in the non-deceleration periods when the signal DEC is in a high level. FIG. 3A shows timing chartss of individual signals when the signal DEC is in a high level. The pulse-width modulator section 70 outputs the signal PWM1, which has the pulse width corresponding to the torque command signal, and supplies the output signal PWM1 to the PWM controller 60. When the signal DEC is in a high level, the PWM controller 60 outputs the AND signal P1d obtained via the AND gate 66 based on the signal PWM1 and the signal S1d outputted from the commutation switch section 30.

The signal PWM1 that has been outputted from the pulse-width modulator section 70 is inverted by the inverter 61, and an inverted signal PWM1a thereof is logically synthesized with the signal S1d by the AND gate 63 via the pass-through preventing circuit 62. An output of the AND gate 63 is logically synthesized with the signal DEC through the AND gate 64. Since the signal DEC is in a high level, the output of the AND gate 63 is inputted to the OR gate 65 through the AND gate 64. In this way, the signal P1u and the signal P1d shown in FIG. 3A can be obtained. In a similar manner, the signals P2u, P2d and P3u, P3d are also obtained.

The signals P1u to P3d thus obtained cause the drive transistors to perform ON/OFF operation. The pass-through preventing circuit 62 regulates the pulse width so as not to cause the paired transistors of the upper drive section and the lower drive section to turn on at the same time. It is noted here that the signals S1u to S3u and S1d to S3d, shown in FIGS. 3A and 3B, correspond to signals Aa, Ba, and Ca and Ab, Bb, and Cb shown in FIG. 1.

Figure 4A:
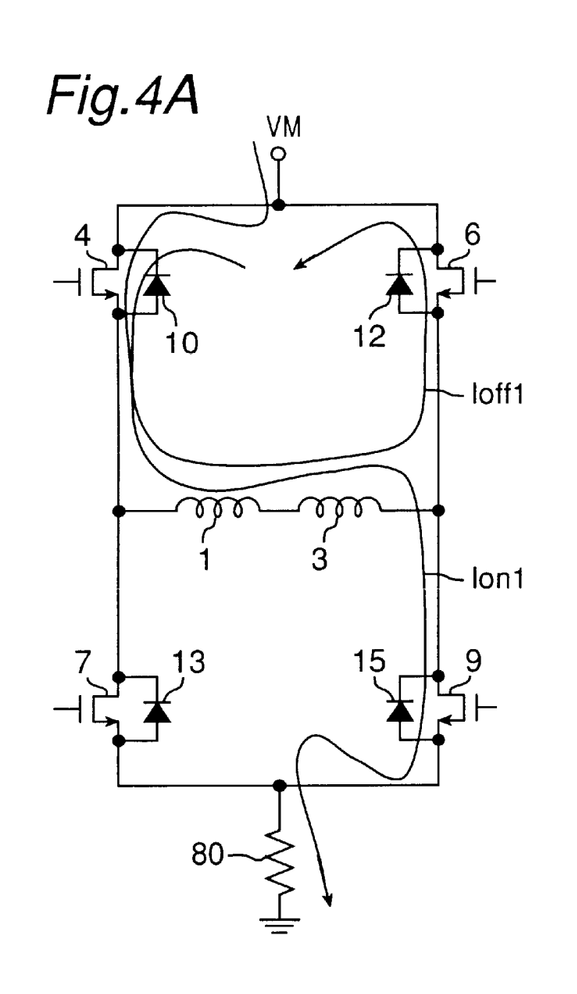
FIGS. 4A and 4B views each for explaining a regenerated current in the first embodiment of the present invention.

FIG. 4A is a view for explaining operation performed when the signal DEC is in a high level, and shows currents flowing to the driving coil in a period (PA) shown in FIG. 3A. The period (PA) shown in FIG. 3A is a phase-switching timing period where the current flows from the power supply terminal VM to the driving coil 1 and then to the driving coil 3. In this period, the drive transistor 4 is kept ON, corresponding to the level of the signal P1u, and the drive transistors 6 and 9 are each driven by the synchronous rectification PWM operation to perform ON/OFF operation, corresponding to the levels of the signals P3u and P3d.

First, when the drive transistor 9 is ON, the drive transistor 6 turns off, and the current shown with a symbol Ion1 in FIG. 4A flows through the driving coils 1 and 3. On the other hand, when the drive transistor 9 is OFF, the drive transistor 6 turns on, and a regeneration current flows through the drive transistor 6, as shown by a symbol Ioff1, based on energy of the driving coils.

Hereinbelow, a description will be made regarding an operation when the signal DEC is in a low level, that is, in the deceleration period. FIG. 3B shows timing charts of individual signals when the signal DEC is in a low level. When the signal DEC is low, the output of the AND gate 64 is kept low. As a result, the signal S1u is outputted as the output signal P1u of the OR gate 65.

Figure 4B:
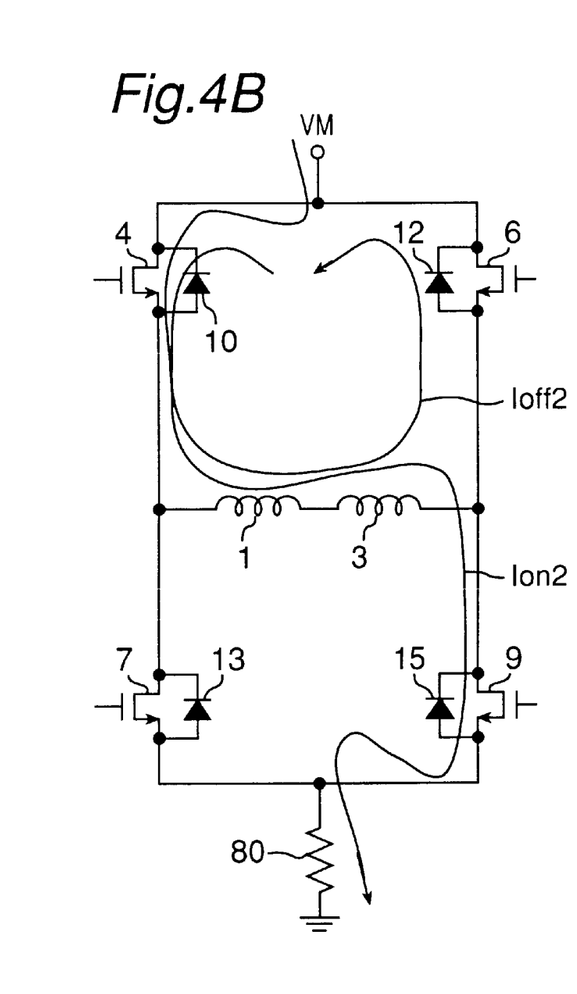

FIG. 4B is a view for explaining an operation when the signal DEC is in a low level, and shows currents flowing through the driving coils 1 and 3 in a period (PB) shown in FIG. 3B. The period (PB) shown in FIG. 3B is a phase-switching timing period where the current flows from the power supply terminal VM to the driving coil 1 and then to the driving coil 3.

The basic operation is the same as in the case where the signal DEC is high. However, the operation is performed in a one-way PWM operation mode in which the ON/OFF operation of the drive transistor 6 is not performed in association with the ON/OFF operation (corresponding to the signal P3d) of the drive transistor 9. Specifically, the signal P3u is maintained low, and the drive transistor 6 is kept OFF. Consequently, when the drive transistor 9 is OFF in the PWM operation, the regeneration current, shown by Ioff2 in FIG. 4B, flows via the diode 12.

The above-described configuration enables the regeneration current flowing path to be switched depending on the levels of the signal DEC. That is, at the activation time and during a steady state operation, the synchronous rectification PWM operation is performed to enable a significantly low-loss operation. In the meanwhile, at the time of draw-back speed control or deceleration operation according to the torque command because of variations in load and the like, an operation mode is switched to perform the one-way PWM operation mode. Thus, a low-loss operation can be implemented in comparison to the case of a linear operation. Concurrently, the flow of negative current to the power supply can be prevented.

As is apparent from the above description of the embodiment, the present invention provides various advantages. The negative current can be prevented that may occur because of variations in the motor revolution, variations in load, or a deceleration command issued as a torque command during synchronous rectification PWM operation. In addition, the present invention solves the problem of causing breakdown in a motor, a motor driver, or a device set including the motor because of increase in power supply voltage according to the power supply impedance increased by the flow of the negative current. Consequently, the present invention enables low power consumption, facilitated motor-revolution control, high performance, and high reliability to be implemented for the operation of the brushless motor.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A motor driver for driving a brushless motor having a plurality of driving coils, comprising:
    a pair of an upper drive section and a lower drive section operatively connected to said driving coils for operating the brushless motor in a plurality of operation modes including a synchronous rectification PWM mode and a one-way PWM mode; and a switching controller for controllably switching the PWM modes between the synchronous rectification PWM mode and the one-way PWM mode in a phase-switching timing period;

wherein the PWM operation mode is switched to perform the one-way PWM operation mode during a deceleration period in operating the brushless motor, and the synchronous rectification PWM mode is performed in a non-deceleration period thereof, to thereby switch a regeneration current flowing path.

2. The motor driver of claim 1, wherein said upper and lower drive section pair includes paired drive switching units for switchably providing driving current to the driving coils, and when one of the paired drive switching units is in a PWM switching-off state in the non-deceleration period of the motor drive, the other of the paired drive switching units is turned on to flow a regeneration current through said the other drive switching unit via the driving coils, whereas, when one of the paired drive switching units is in a PWM switching-off state in the deceleration period of the motor drive, the other of the paired drive switching units is also turned off to flow the regeneration current through a diode connected in parallel to said the other drive switching unit.

3. A motor driver for driving a brushless motor which includes a rotor magnet and driving coils disposed to oppose said rotor magnet, comprising:

upper drive means constituted of a plurality of drive elements which are connected to said driving coils and are provided on one power supply line;

lower drive means constituted of a plurality of drive elements which are connected to said driving coils and are provided on another power supply line;

position detector means for detecting a positional relationship between said rotor magnet and said driving coils;

commutation switching means for generating a commutation switching signal to be supplied to said driving coils based on output signals of said position detector means;

pulse-width modulator means which receives a torque command signal for controlling a generated torque of the brushless motor and generating an arbitrary frequency signal having a pulse width corresponding to the torque command signal; and PWM control means for controlling on/off operation of said upper drive means and said lower drive means based on output signals of said commutation switching means and an output signal of said pulse-width modulator means, wherein said PWM control means enables a synchronous rectification PWM operation to drive both said upper drive means and said lower drive means to perform a PWM operation, and said PWM control means does not perform the synchronous rectification PWM operation in a deceleration period in which a brake-wise current flows through said driving coils.

4. The motor driver of claim 3, further comprising deceleration detector means for detecting a deceleration period in the torque command signal and supplying a detection result to said PWM control means.

5. The motor driver of claim 3, wherein said PWM control means comprises a regeneration current control means for switching between on/off operations of said upper drive means and said lower drive means so that regeneration current in said driving coils which occurs during motor rotation due to the on/off operation of one of said upper drive means and said lower drive means does not reversely flow back to the power supply line.

6. The motor driver of claim 5, wherein said regeneration current control means is operable to switch between a synchronous rectification PWM mode and a one-way PWM mode, said synchronous rectification PWM mode being for driving both of said upper drive means and said lower drive means to perform the PWM operation and said one-way PWM mode being for driving only one of said upper drive means and said lower drive means to perform the PWM operation.

7. A motor which is driven in a PWM operation by using the motor driver as claimed in claim 1.

8. An information equipment using the motor of claim 7.

* * * * *